US 6,550,803 B1

(12) United States Patent
Derrick

(10) Patent No.: US 6,550,803 B1
(45) Date of Patent: Apr. 22, 2003

(54) COVERING FOR A GAS BAG OF A VEHICLE OCCUPANT RESTRAINT SYSTEM

(75) Inventor: John-Oliver Derrick, Hettstadt (DE)

(73) Assignee: TRW Automotive Safety Systems GmbH & Co. KG, Aschaffenburg (DE)

( * ) Notice: Subject to any disclaimer, the term of this patent is extended or adjusted under 35 U.S.C. 154(b) by 0 days.

(21) Appl. No.: 09/632,518

(22) Filed: Aug. 4, 2000

(30) Foreign Application Priority Data

Aug. 6, 1999 (DE) .......................... 299 13 741

(51) Int. Cl.⁷ .............................. B60R 21/20
(52) U.S. Cl. ............... 280/728.3; 280/731; 280/732
(58) Field of Search ............. 280/728.1, 728.3, 280/731, 732

(56) References Cited

U.S. PATENT DOCUMENTS

| 5,084,122 | A | * | 1/1992 | Fukushima et al. | 280/728.1 |
| 5,322,324 | A | * | 6/1994 | Hansen et al. | 280/732 |
| 5,342,088 | A | * | 8/1994 | Bauer | 280/728.1 |
| 5,452,913 | A | * | 9/1995 | Hansen et al. | 280/728.1 |
| 5,456,493 | A | * | 10/1995 | Bauer et al. | 280/743.1 |
| 5,730,460 | A | * | 3/1998 | Niederman | 280/731 |
| 5,893,581 | A | * | 4/1999 | Niederman | 280/731 |
| 5,913,534 | A | * | 6/1999 | Klingauf | 280/728.3 |
| 5,941,557 | A | * | 8/1999 | Mullins, Jr. et al. | 280/728.3 |
| 5,941,558 | A | * | 8/1999 | Labrie et al. | 280/728.3 |
| 6,045,154 | A | * | 4/2000 | Walton et al. | 280/728.3 |
| 6,053,526 | A | * | 4/2000 | Preisler et al. | 280/728.2 |
| 6,062,595 | A | * | 5/2000 | Ha | 280/731 |
| 6,099,027 | A | * | 8/2000 | Shirk et al. | 280/728.3 |
| 6,105,999 | A | * | 8/2000 | Johnson | 280/727 |
| 6,135,489 | A | * | 10/2000 | Bowers | 280/728.3 |
| 6,158,764 | A | * | 12/2000 | Preisler et al. | 280/728.2 |
| 6,247,724 | B1 | | 6/2001 | Jambor et al. | 280/731 |

FOREIGN PATENT DOCUMENTS

| DE | 4437773 | 10/1995 |
| DE | 29606004 | 7/1996 |
| DE | 19617758 | 9/1997 |
| DE | 19749914 | 5/1999 |
| EP | 0968888 | 1/2000 |

* cited by examiner

Primary Examiner—Eric Culbreth
Assistant Examiner—L. Lum
(74) Attorney, Agent, or Firm—Tarolli, Sundheim, Covell & Tummino L.L.P.

(57) ABSTRACT

A gas bag covering for a vehicle occupant restraint system comprises a plurality of tear lines of which all are oriented towards one point.

5 Claims, 1 Drawing Sheet

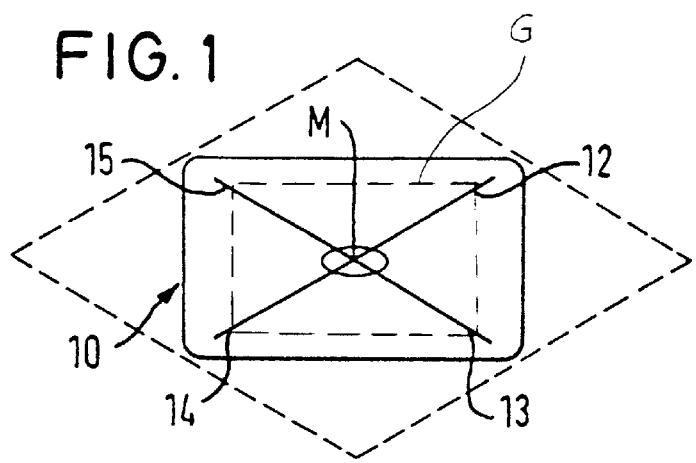
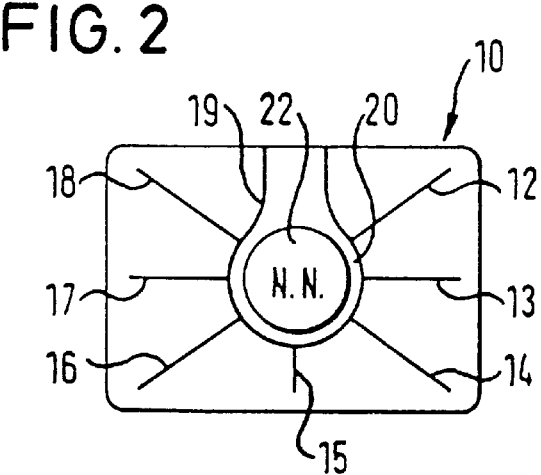
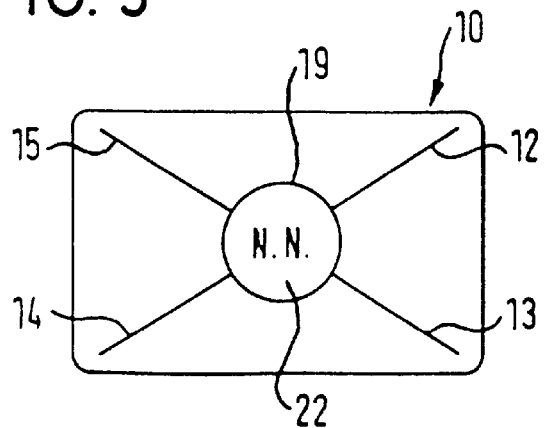

COVERING FOR A GAS BAG OF A VEHICLE OCCUPANT RESTRAINT SYSTEM

TECHNICAL FIELD

The invention relates to a covering for a gas bag of a vehicle occupant restraint system.

BACKGROUND OF THE INVENTION

After a gas generator providing compressed gas has been activated, the gas bag is acted upon with pressure so that it presses against the covering. The latter then bursts along a tear line provided in the covering for enabling the gas bag to completely unfold in the vehicle interior and to provide a restraint effect for a vehicle occupant.

The process of the gas bag exiting from the receptacle provided therefor when the covering has opened is decisively influenced by how the covering opens. This in turn depends on the tear line or the tear lines which are provided. The tear lines preferably provide for a uniform opening of the covering without too large a resistance being opposed to the opening process while at the same time a sufficient rigidity is ensured so that the covering is not damaged during normal vehicle operation.

BRIEF SUMMARY OF THE INVENTION

The invention provides a gas bag covering for a vehicle occupant restraint system. The cover is provided with a plurality of tear lines. All of theses tear lines are oriented towards one point. In this manner, the tearing process may be initiated centrally and then continue outwardly so that the individual portions of the covering swing open outwardly and make it possible for the gas bag to unfold unhindered.

According to one embodiment, it is provided for that the tear lines converge at a center point in a star-shaped manner. Thus, the process of opening the covering begins centrally at that point of the covering where the strongest tensions occur when the gas bag presses against the still closed covering from inside.

According to an alternative embodiment, it is provided for that the tear lines terminate at the periphery of an additional tear line which is circular and disposed approximately at the center of the covering. In this configuration, the process of ripping-open is initiated along the circular tear line; it then continues along the rectilinear tear lines oriented towards one point. This configuration makes it possible to provide within the circular tear line a receiving surface for a brand label, for instance.

When a brand label is used, a reinforcement may be attached to the receiving surface constituted by the circular tear line. The reinforcement ensures that the receiving surface together with the brand label is not detached from the covering when the latter is ripped open, but remains reliably connected therewith. The reinforcement may for instance be a sheet metal piece inserted in the covering.

According to an alternative embodiment, it is provided for that the circular tear line is closed in itself and that the receiving surface is connected with a tether. In this configuration, the receiving surface is completely detached from the covering after the circular tear line has initiated the process of ripping-open; the tether is provided in order to prevent the covering from being flung into the vehicle interior by the unfolding gas bag; it ensures that the receiving surface together with the brand label moves along a controlled path.

Advantageous configurations of the invention may be taken from the subclaims.

BRIEF DESCRIPTION OF THE DRAWINGS

FIG. 1 shows a schematic plan view of a covering according to a first embodiment of the invention;

FIG. 2 shows a schematic plan view of a covering according to a second embodiment of the invention; and FIG. 3 shows a schematic plan view of a covering according to a third embodiment of the invention.

DETAILED DESCRIPTION OF THE PREFERRED EMBODIMENTS

FIG. 1 shows a covering 10 serving to close a gas bag of a vehicle occupant restraint system, which is folded in the rest position, against the vehicle interior. The covering 10, whose side facing the vehicle interior is represented in FIG. 1, comprises four tear lines 12, 13, 14, 15 which are predefined by a weakened material portion, for instance. In the initial condition, the tear lines are not continuous, i.e. not visible from outside, so that the covering comprises a continuously closed surface as seen from the vehicle interior. A gas bag G located behind the covering 10 is indicated with a broken line in FIG. 1.

The tear lines 12, 13, 14, 15 all are oriented towards one point, namely a center point M, which is situated approximately at the center of the surface of covering 10. Thus, the tear lines are oriented to form a star shape.

When the folded gas bag presses against the covering from inside, the process of opening the covering is initiated due to the fact that the predefined tear lines begin to rip open in the region of the center point M. This process continues outwardly in a star-like manner so that the covering portions formed between the tear lines 12, 13, 14, 15 may be folded outwardly. The outwardly folded covering portions are indicated in dashed lines in FIG. 1.

FIG. 2 shows a covering in which seven tear lines 12 to 18 disposed in a star-shaped manner are provided. These tear lines are also disposed in a star-shaped manner, however, they do not meet in a center point, but terminate at an additional tear line 19. Starting from the outer edge of the covering, this tear line 19 runs towards the center and extends circularly in the center of the covering so that a receiving surface 20 for a brand label 22 is formed.

Here the bursting process starts along the circular section of the tear line 19 and then continues outwardly in a star-shaped manner so that the gas bag may unfold through the covering. This receiving surface 20 together with the brand label 22 attached thereto is folded outwardly similarly like any other covering portion. In order to reliably prevent the brand label 22 from getting detached from the corresponding covering portion, a reinforcing part made of sheet metal, for instance, may be incorporated by foaming into the covering portion delimited by the tear line 19.

FIG. 3 shows a further embodiment in which the circular tear line 19, which is provided in addition to rectilinear tear lines 12, 13, 14, 15 oriented towards the center of the covering, is closed in itself Thus, a centrally disposed covering portion is defined to which the brand label 22 is attached. On the underside of the covering, a tether is provided in the region of the receiving surface for the brand label 22, which tether is for instance fixedly connected with the housing of the gas bag module situated under the covering. The tether prevents the brand label and the associated covering portion from being flung into the passenger cell in an uncontrolled manner after the process of ripping-open had been initiated along the tear line 19 and then continues in a star-shaped manner outwardly along the tear lines 12–15.

What is claimed is:

1. A gas bag covering for a vehicle occupant restraint system, said covering being provided with a plurality of linear tear lines, said tear lines all being oriented towards one point, wherein said tear lines terminate at a periphery of an additional tear line which is circular and disposed approximately at a center of said covering, said circular tear line enclosing a receiving surface and a brand label located on said receiving surface within said circular tear line, said receiving surface being free of any tear lines.

2. The cover of claim 1, wherein a reinforcement is attached to said receiving surface.

3. The covering of claim 2, wherein said reinforcement is a sheet metal piece inserted in said covering.

4. The cover of claim 1, wherein said circular tear line is closed in itself and said receiving surface is connected with a tether.

5. The cover of claim 1, wherein said tear lines oriented towards one point extend rectilinearly.

* * * * *